United States Patent
Kasahara et al.

(10) Patent No.: US 9,115,010 B2
(45) Date of Patent: Aug. 25, 2015

(54) DEMINERALIZER OF PRIMARY COOLANT SYSTEM IN PRESSURIZED-WATER REACTOR POWER PLANT AND METHOD FOR PURIFYING PRIMARY COOLING WATER IN PRESSURIZED-WATER REACTOR POWER PLANT

(75) Inventors: Satoshi Kasahara, Tokyo (JP); Yusuke Suwa, Tokyo (JP); Chika Kenmochi, Tokyo (JP)

(73) Assignee: ORGANO CORPORATION, Tokyo (JP)

( * ) Notice: Subject to any disclaimer, the term of this patent is extended or adjusted under 35 U.S.C. 154(b) by 1155 days.

(21) Appl. No.: 12/483,034

(22) Filed: Jun. 11, 2009

(65) Prior Publication Data
US 2009/0310733 A1    Dec. 17, 2009

(30) Foreign Application Priority Data

Jun. 11, 2008  (JP) .................. 2008-152947
Jun. 11, 2008  (JP) .................. 2008-152948

(51) Int. Cl.
| | |
|---|---|
| G21C 19/00 | (2006.01) |
| C02F 1/42 | (2006.01) |
| B01J 41/12 | (2006.01) |
| G21C 19/307 | (2006.01) |
| G21C 19/46 | (2006.01) |
| C02F 1/66 | (2006.01) |
| C02F 1/68 | (2006.01) |
| C02F 1/70 | (2006.01) |
| C02F 1/72 | (2006.01) |
| C02F 103/02 | (2006.01) |

(52) U.S. Cl.
CPC . *C02F 1/42* (2013.01); *B01J 41/12* (2013.01); *G21C 19/307* (2013.01); *G21C 19/46* (2013.01); *C02F 1/66* (2013.01); *C02F 1/68* (2013.01); *C02F 1/70* (2013.01); *C02F 1/722* (2013.01); *C02F 2001/422* (2013.01); *C02F 2001/425* (2013.01); *C02F 2001/427* (2013.01); *C02F 2103/023* (2013.01)

(58) Field of Classification Search
CPC ....... G01N 30/02; G01N 30/58; B01D 15/36; B01D 59/30; G21C 19/307; G21C 19/46
USPC .......... 376/277, 305, 306, 308–315; 210/683, 210/198.2; 423/276
See application file for complete search history.

(56) References Cited

U.S. PATENT DOCUMENTS

| | | | | |
|---|---|---|---|---|
| 6,007,712 A | * | 12/1999 | Tanaka et al. ................. | 210/151 |
| 6,911,481 B2 | * | 6/2005 | Tanaka et al. ................... | 521/26 |
| 6,944,254 B2 | * | 9/2005 | Kormuth et al. ............... | 376/306 |

FOREIGN PATENT DOCUMENTS

| | | | | |
|---|---|---|---|---|
| JP | 58-219946 | | * 12/1983 | ............... B01J 41/04 |
| JP | 58-219946 A | | 12/1983 | |

(Continued)

OTHER PUBLICATIONS

Office Action issued Jul. 11, 2011 in corresponding Japanese Patent Application No. 2008-152947.
Office Action issued Sep. 9, 2011 in corresponding Japanese Patent Application No. 2008-152948.

*Primary Examiner* — Jack W Keith
*Assistant Examiner* — Julia Prendergast
(74) *Attorney, Agent, or Firm* — Knobbe Martens Olson & Bear LLP

(57) ABSTRACT

By using a boric acid-resistant anion exchange resin as the anion exchange resin used in a demineralizer that purifies the primary cooling water in a pressurized-water reactor power plant, even when a boric acid-containing primary cooling water is brought into contact with the anion exchange resin disposed in the demineralizer, the generation of breaking or cracking in the anion exchange resin can be prevented.

8 Claims, 1 Drawing Sheet

(56) References Cited

FOREIGN PATENT DOCUMENTS

| JP | 59-17194 A | | 1/1984 | |
| JP | 2005-003597 A | | 1/2005 | |
| JP | 2005-03598 | * | 1/2005 | |
| JP | 2005-003598 A | | 1/2005 | |
| JP | 2005-3598 A | | 1/2005 | |
| JP | 2007-216094 | * | 8/2007 | B01J 41/12 |
| JP | 2007-216094 A | | 8/2007 | |

* cited by examiner

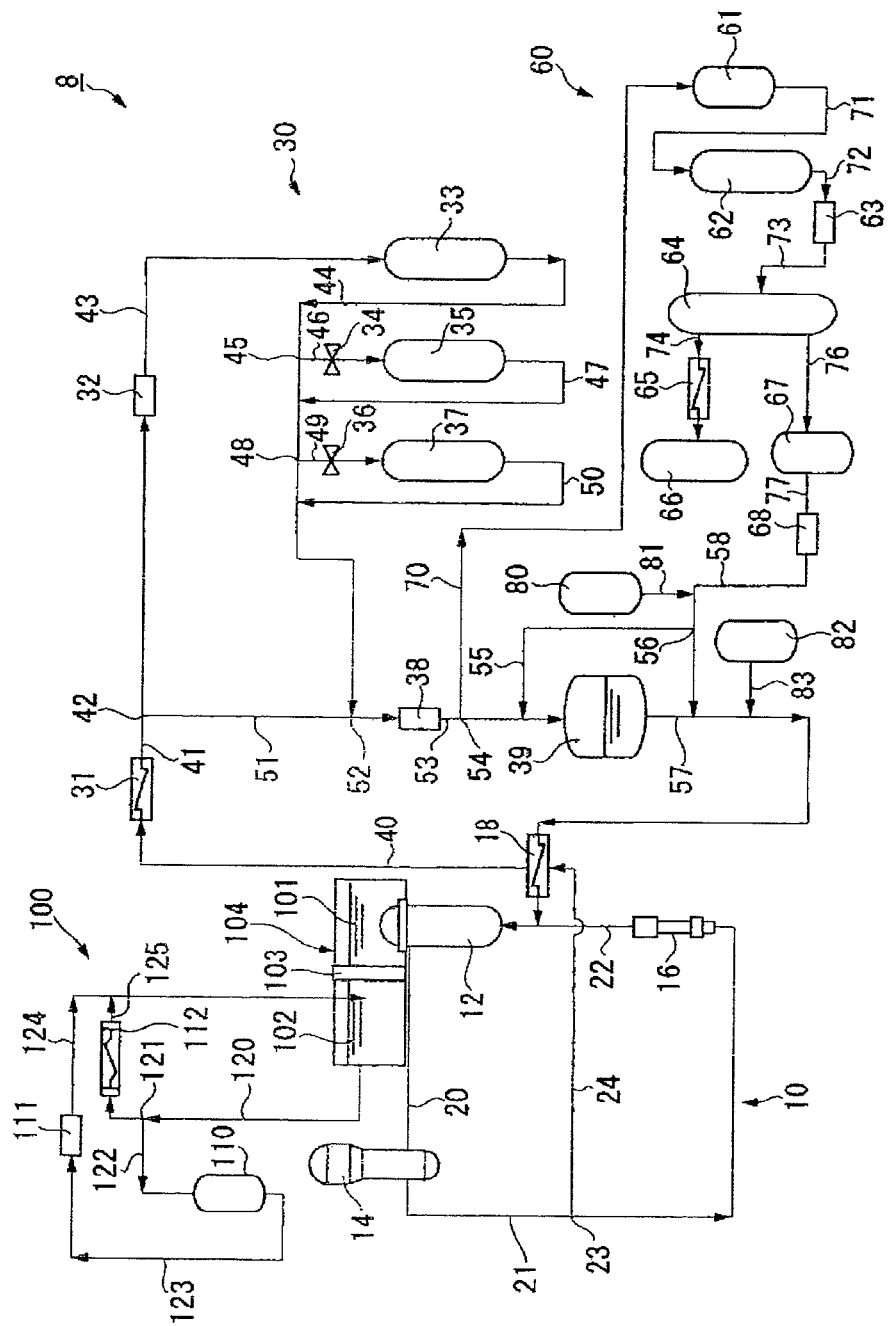

DEMINERALIZER OF PRIMARY COOLANT SYSTEM IN PRESSURIZED-WATER REACTOR POWER PLANT AND METHOD FOR PURIFYING PRIMARY COOLING WATER IN PRESSURIZED-WATER REACTOR POWER PLANT

BACKGROUND OF THE INVENTION

1. Field of the Invention

The present invention relates to a demineralizer of the primary coolant system and a method for purifying the primary cooling water in the pressurized-water reactor power plant.

2. Description of the Related Art

In the pressurized-water power plant, there are two major systems utilized to convert the heat generated in the nuclear reactor into electrical power. The first one, the primary system, transfers the heat from the reactor to the second one, the secondary system. The heat generates steam in the steam generator in the secondary system, which is transferred to the main turbine, where it generates electricity. After going through the low pressure turbine, the steam is routed to the main condenser. Cool water flowing through tubes in the condenser removes heat from the steam, allowing the steam to condense. The water is then pumped back to the steam generator for reuse. In order to perform these functions, there are approximately one hundred supporting units in the primary and secondary systems. Among them, the demineralizer of the primary coolant system is the one that is essential.

Various demineralizers are installed in the primary coolant systems, a chemical and volume control system (CVCS), a boric acid recovery system (BRS) and a spent fuel pit water cooling system (SFPCS), for example, to remove impurities such as chloride ion and fluoride ion, fission products such as $^{131}$I, and corrosion products of $^{58}$Co, $^{60}$Co, nickel, iron and the like contained in the primary cooling water.

For the purpose of achieving such purification of the primary cooling water, in each of the CVCS, the BRS and the SFPCS, a mixed bed demineralizer is installed. Among the inventions relating to the operation of the mixed bed demineralizer, an invention relating to the mixing ratio between a cation exchange resin and an anion exchange resin has been reported in Japanese Patent Laid-Open No. 2005-3598. It should be noted that in the demineralizer of the primary coolant system, a gel- and OH-form anion exchange resin has been generally used as the anion exchange resin.

Boric acid is added to the primary cooling water, for the purpose of controlling the critical state of the reactor fuel. In particular, during a periodic inspection or fuel exchange, the boron concentration of the primary cooling water is increased so as to maintain the fuel at a subcritical state. Then, at the resumption of the operation of the PWR power plant, the primary cooling water, which has a boron concentration higher than that in the normal operation, goes threw the demineralizer and conducts boric acid exchange. In recent years, for the purpose of improving the power generation efficiency and the operation rate, the use of high burnup fuel has been considered. When such high burnup fuel is used, it will be necessary to further increase the boron concentration of the primary cooling water at the halt of the operation of the PWR power plant.

SUMMARY OF THE INVENTION

For the anion exchange resin used in the demineralizer of the primary coolant system in a PWR power plant, gel-type anion exchange resins have been used because they are higher in ion exchange capacity than porous anion exchange resins.

However, according to the study of the present inventors, there was a problem that, when a boric acid aqueous solution, which has a concentration of, for example, greater than 3000 ppm in terms of the boron concentration, went threw in the demineralizer of the primary coolant system in a PWR power plant, a conventional gel-type anion exchange resin loaded therein was broken or cracked. Such breaking or cracking causes the destruction of the ion exchange resin accompanying the exfoliation of fine resin flakes or debris. Further, the exfoliated fine resin flakes or debris flowing out from the demineralizer increase the differential pressure in the filter disposed downstream of the demineralizer, and the frequency of filter replacement is increased. This increases not only radioactive waste but also labor load under the exposure to radiation.

An object of the present invention is to provide a demineralizer of the primary cooling systems in a PWR power plant, which does not cause breaking or cracking in the anion exchange resin even when the anion exchange resin is brought into contact with the boric acid-containing primary cooling water.

The present inventors investigated the anion exchange resin that satisfies two requirements, namely, sufficient ion exchange capacity and durability in the demineralization of the above-described high boric acid-containing primary cooling water. Consequently, the present inventors have found the new properties of the porous anion exchange resin satisfying both of these requirements.

Further, the present inventors also obtained a new finding that by controlling the conditions of the conversion treatment of the anion exchange resin into a borate ion form, an anion exchange resin can acquire boric acid-resistance while ensuring the capability of demineralizing the high boric acid-containing primary cooling water.

On the basis of these new findings, the present inventors have completed the present inventions capable of achieving the above-described boric acid-resistance.

The demineralizer of the present invention purifying the primary cooling water in the primary coolant system of a pressurized-water reactor power plant comprises a boric acid-resistant anion exchange resin-containing layer.

As the boric acid-resistant anion exchange resin used in the demineralizer, the following boric acid-resistant anion exchange resins are preferable:

(1) a porous anion exchange resin having a pore volume of 0.05 to 0.50 mL/g-dry resin (measured with Cl form) and an average pore radius of 2 to 50 nm (measured with Cl form); and (2) a borate-form anion exchange resin.

The demineralizer according to the present invention is suitable for conducting demineralization treatment as being installed at least in one of a chemical and volume control system, a boric acid recovery system and a spent fuel pit water cooling system in the primary coolant system in a pressurized-water reactor power plant.

An aspect of the method for preparing a borate-form anion exchange resin for purifying the primary cooling water in a pressurized-water reactor power plant according to the present invention comprises a borate ion replacement step by passing a boric acid aqueous solution through a resin layer comprising an OH-form anion exchange resin in a container, wherein the boric acid aqueous solution goes threw while the boron concentration is increased along with the integrated flow volume of the boric acid aqueous solution.

The boron concentration of the boric acid aqueous solution initially brought into contact with the resin layer in the borate ion replacement step is preferably 3000 ppm or less.

Another aspect of the method for preparing a borate-form anion exchange resin for purifying the primary cooling water in a pressurized-water reactor power plant according to the present invention comprises a borate ion replacement step by passing a boric acid aqueous solution through a resin layer comprising an OH-form anion exchange resin in a container, wherein the boric acid aqueous solution goes threw through the resin layer at a space velocity SV of 15 L/L-R·h$^{-1}$ or less.

The method for purifying the primary cooling water in the primary coolant system of a pressurized-water reactor power plant according to the present invention comprises:

A step setting the demineralizer of the primary coolant system having the above-described boric acid-resistant anion exchange resin in the primary coolant system; and A step conducting demineralization by bringing the primary wastewater into contact with the demineralizer.

The primary coolant system of a pressurized-water reactor power plant according to the present invention comprises the demineralizer having the above-described boric acid-resistant anion exchange resin for demineralization of the primary cooling water.

The demineralizer having the above-described boric acid resistant anion exchange resin is preferably installed at least in one of the chemical and volume control system, the boric acid recovery system and the spent fuel pit water cooling system in the primary coolant system.

According to the present invention, even when the boric acid-containing primary cooling water is brought into contact with the anion exchange resin loaded in the demineralizer, the breaking or the cracking of the loaded anion exchange resin can be prevented.

BRIEF DESCRIPTION OF THE DRAWING

FIG. 1 is a schematic diagram illustrating the primary coolant system of a PWR power plant, representing the primary coolant system as an example of the embodiments of the present invention.

DETAILED DESCRIPTION OF THE PREFERRED EMBODIMENTS

The demineralizer according to the present invention is used in the demineralization treatment of the primary cooling water in a pressurized-water reactor (PWR) power plant and has an ion exchanger that comprises a boric acid-resistant anion exchange resin. The ion exchanger can be used particularly preferably for demineralization of the boric acid-containing water in various systems that treat the primary cooling water. The ion exchanger has an ion exchange resin layer, which is brought into contact with the primary cooling water. The ion exchange resin layer is composed of at least a boric acid-resistant anion exchange resin. The ion exchange resin layer may be composed of a boric acid-resistant anion exchange resin or may be formed of a mixed bed including another ion exchange resin. The composition of the ion exchange resin layer may be selected according to the treatment purpose of the primary cooling water.

Preferable boric acid-resistant ion exchange resins include a porous anion exchange resin and a borate-form anion exchange resin.

(Porous Anion Exchange Resin)

The porous anion exchange resin may be either of a porous type or a macroporous (MR) type as long as it is porous. The use of a porous resin can prevent the breaking or the cracking caused by the contact with high concentrations of boric acid. Specifically, the pore volume of the porous anion exchange resin is set at 0.05 to 0.50 mL/g-dry resin (measured with Cl form) and the average pore radius is set at 2 to 50 nm (measured with Cl form).

The pore volume less than 0.05 mL/g-dry resin (measured with Cl form) may lead to breaking or cracking of the porous anion exchange resin when the resin is brought into contact with boric acid. On the other hand, the pore volume greater than 0.50-mL/g-dry resin (measured with Cl form) may lead to the load strength degradation of the resin.

The average pore radius of the porous anion exchange resin set at 2 nm (measured with Cl form) or more effectively enables the resin to prevent breaking or cracking when it is brought into contact with boric acid. The average pore radius of the porous anion exchange resin set at 50 nm (measured with Cl form) or less enables the resin to ensure a preferable ion exchange capacity.

The porous anion exchange resin having the above-described, specific pore volume and average pore radius prevents breaking or cracking therein even when used for treating a boric acid-containing primary wastewater, and thus enables the resin to eliminate the unfavorable effects on the filter disposed in the stage subsequent to the demineralizer caused by fine fragments coming from the anion exchange resin.

The pore volume and the average pore radius can be calculated by the following method according the mercury intrusion porosimetry.

A hydrochloric acid aqueous solution (1 mol/L) is brought into contact with 15 mL of an anion exchange resin at a rate of 9 to 10 mL/min, to convert the anion exchange resin into a chloride ion form. Then, the medium for the anion exchange resin is successively replaced with methanol, toluene and isooctane in this order, and anion exchange resin is dried in a vacuum dryer at 60° C. for 8 hours. The dried anion exchange resin is placed in a measurement cell, and mercury is charged in the cell, in which mercury is charged with pressure and intrudes into the pores. The pressure and the intrusion amount of mercury are measured to obtain the pore volume. By assuming that the pore is cylindrical, the pore radius is also obtained. The relation between the applied pressure and the pore size permitting intrusion of mercury under the applied pressure is represented by the following formula (1) (Washburn formula). As an example of the measurement apparatus of the pore volume and the average pore radius, a mercury porosimeter (Autopore IV 9520, manufactured by Shimadzu Corp.) may be employed.

$$-4\sigma \cos \theta = PD \quad (1)$$

σ: Surface tension of mercury (0.475 N/m)
θ: Contact angle (140°)
D: Pore diameter (m)
P: Pressure (Pa)

The gel-type anion exchange resins having hitherto been used undergo rapid contraction when brought into contact with a high concentration boric acid aqueous solution, due to the rapid ion form change and the osmotic pressure difference, and thus undergo breaking or cracking probably because of the inability to bear the volume change. On the other hand, in the porous anion exchange resin, the contraction effect is buffered by the pores in the resin at the time of rapid contraction thereof and hence such a porous resin is probably prevented from breaking and cracking thereof.

The matrix of the porous anion exchange resin is not particularly limited. A porous anion exchange resin having a styrene matrix or an acrylic matrix is preferable. Additionally, the porous anion exchange resin may be either a strongly basic anion exchange resin or a weakly basic anion exchange resin. Preferable of these is the strongly basic anion exchange resin.

The particle size of the porous anion exchange resin can preferably be in a range from 500 μm to 800 μm in terms of the harmonic average diameter.

Examples of such a porous anion exchange resin may include Amberlite (trade name) IRA900, Amberjet (trade name) 9090 (both manufactured by Rohm and Haas Co.).

(Borate Ion-Form Anion Exchange Resin)

The borate-form anion exchange resin has borate ion as the ionic group. The borate-form anion exchange resin is obtained by replacing its ionic group with borate ion. As such an anion exchange resin used, an OH-form anion exchange resin is preferable. The replacement with borate ion may be conducted before the ion exchange resin is incorporated into the container of the demineralizer or may be conducted in situ in the demineralizer.

The type of the borate-form anion exchange resin is not particularly limited. The borate-form anion exchange resin may be either of a gel type or of a porous type (including a porous type and a macroporous (MR) type). The matrix of the anion exchange resin is not particularly limited. As the matrix, a styrene matrix and an acrylic matrix are preferable. The borate-form anion exchange resin may be either a strongly basic anion exchange resin or a weakly basic anion exchange resin. Preferable of these is the strongly basic anion exchange resin.

The particle size of the anion exchange resin used for obtaining therefrom the borate-form anion exchange resin can preferably be in a range from 500 μm to 800 μm in terms of the harmonic average diameter.

Examples of the anion exchange resin used in preparation of the borate-form anion exchange resin may include Amberlite (trade name) IRN78, Amberlite (trade name) PCA1, Amberite (trade name) IRA900 and Amberjet (trade name) 9090 (all manufactured by Rohm and Haas Co.).

The preparation of the borate-form anion exchange resin by the replacement with borate ion can be conducted by passing a boric acid-aqueous solution through the anion exchange resin. The solution passing conditions are set so as to enable the resin to obtain a borate ion-form having an intended boric acid resistance.

The replacement of OH of the OH-form anion exchange resin with borate ion is described below.

(First Method of Borate Ion Replacement)

The first method to replace OH of the OH-form anion exchange resin with borate ion comprises a step of loading the OH-form anion exchange resin in a container or vessel to form a resin layer, and a step of conducting the replacement of OH with borate ion by passing the boric acid aqueous solution through the resin layer. In the borate ion replacement step, a method of continuously or intermittently increasing the boron concentration along with the integrated flow volume of the boric acid aqueous solution can be applied.

The borate ion replacement in the first method can be conducted, for example, as follows:

First, the OH-form anion exchange resin is loaded in a container or a vessel to form a resin layer. Next, a boric acid aqueous solution lower in the boron concentration than the primary cooling water goes threw through the resin layer to replace OH in the OH-form anion exchange resin with borate ion. Then, by passing through the resin layer a boric acid aqueous solution being the same in the boron concentration as the primary cooling water or the primary cooling water pre se, the borate ion replacement step can be completed. Examples of such a borate ion replacement may include a method, in which, when the boron concentration of the primary cooling water finally passed is 5000 ppm, a boric acid aqueous solution having a boron concentration of 2500 ppm goes threw through the resin layer, and thereafter, the primary cooling water having a boron concentration of 5000 ppm goes threw through the resin layer, in the borate ion replacement step.

In the borate ion replacement step, the boron concentration of the boric acid aqueous solution to be first brought into contact with the resin layer can namely be determined by taking into account the factors such as the polymerization degree and the strength of the matrix resin of the ion exchange resin. Such boron concentrations are preferably, for example, 3000 ppm or less and more preferably 2500 ppm or less. The boron concentrations higher than 30 ppm are preferable and those higher than 300 ppm are more preferable.

This is because when the boron concentration of the boric acid aqueous solution being first passed is too high, a rapid contraction occurs in the OH-form anion exchange resin, and there may be a risk of breaking or cracking at the time of contraction. In particular, in the gel-type anion exchange resin, this contraction is remarkable.

The switching of the boric acid concentrations may be conducted at, but is not limited to, the time of the completion of the solution passage of one to fifteen times the volume of the anion exchange resin. Additionally, the boric acid concentration at the initial solution passage is preferably set at a lower value, and the boric acid concentration increase step is preferably more gradual.

The flow rate of the boric acid aqueous solution in the first method of borate ion replacement is not particularly limited, but is preferably set at 20 L/L-R·h$^{-1}$ or less in terms of the space velocity (SV). The SV is more preferably set at 15 L/L-R·h$^{-1}$ or less. This is because when the SV is greater than 20 L/L-R·h$^{-1}$, the OH-form gel-type anion exchange resin has the risk of breaking or cracking.

The SV is the flow volume (L) per 1 hour in relation to the unit volume (L-R) of the ion exchange resin, and is represented by L/L-R·h$^{-1}$ (hereinafter, the same definition will be also applicable).

The flow rate of the solution to be passed in the borate ion replacement step is preferably set at 10 m/h or more in terms of the linear flow rate so as to prevent the unbalanced flow of the solution in the anion exchange resin layer.

In the first method of borate ion replacement, the temperature of the flow of the boric acid aqueous solution is not particularly limited, but is preferably 20 to 60° C. and more preferably 30 to 40° C. This is because when the flow temperature is lower than 20° C., no required amount of boric acid is dissolved, and when higher than 60° C., such a temperature is higher than the maximum allowable working temperature of the anion exchange resin.

(Second Method of Borate Ion Replacement)

A second method of replacement of OH in the OH-form anion exchange resin with borate ion includes a step of loading the OH-form anion exchange resin in a container or a vessel to form a resin layer and a step of conducting the replacement of OH in the OH-form anion exchange resin with borate ion by passing the boric acid aqueous solution through the resin layer. In the borate ion replacement step, the boric acid aqueous solution goes threw at a SV of 15 L/L-R·h$^{-1}$ or less.

The flow rate of the boric acid aqueous solution of the second method is preferably set a SV of 15 L/L-R·h$^{-1}$ or less. SV=10 to 12 L/L-R·h$^{-1}$ is more preferable. This is because when the SV is greater than 15 L/L-R·h$^{-1}$, the OH-form anion exchange resin more frequently undergoes breaking or cracking. This is also because when the SV is less than 10 L/L-R·h$^{-1}$, the borate ion replacement takes time.

The boron concentration of the boric acid aqueous solution in the second method is set so as to obtain an intended boric acid resistance. The boron concentration can be determined according to the borate ion replacement degree of the anion exchange resin. The boron concentrations higher than 30 ppm are preferable and those higher than 300 ppm are more preferable. It could practically be determined, for example, within a range from 2000 to 10000 ppm.

In the second method, the temperature of the flow of the boric acid aqueous solution is not particularly limited, but is preferably 20 to 60° C. and more preferably 30 to 40° C. This is because when the flow temperature is lower than 20° C., no required amount of boric acid is dissolved, and when higher than 60° C., such a temperature is higher than the maximum allowable working temperature of the anion exchange resin.

The OH-form gel-type anion exchange resins having hitherto been used undergo rapid contraction when brought into contact with a high concentration boric acid aqueous solution, due to the rapid ion form change and the osmotic pressure difference, and thus undergo breaking or cracking probably as a result of the inability to bear the volume change. On the other hand, in the borate-form anion exchange resin, the replacement of OH with borate ion in the ion exchange group is accomplished, and hence even when the borate-form anion exchange resin is brought into contact with a high concentration boric acid aqueous solution, no above-described resin contraction occurs.

(Primary Coolant System)

FIG. 1 shows an embodiment of the primary coolant system to which the demineralizer according to the present invention is applicable.

FIG. 1 is a schematic diagram illustrating the primary coolant system 8 of a PWR power plant. As shown in FIG. 1, the primary coolant system 8 includes a primary cooling water circulation system 10, a CVCS 30, a BRS 60 and an SFPCS 100.

The "demineralizer for use in the primary coolant system" according to the present invention is utilized in the present embodiment as a mixed bed demineralization vessel 33 and a boron removal demineralization vessel 37 of the CVCS 30, a mixed bed demineralization vessel 62 of the BRS 60, and a mixed bed demineralization vessel 110 of the SFPCS 100.

Hereinafter, each of these systems is described.

(Primary Cooling Water Circulation Line)

The primary cooling water circulation line 10 supplies the heat generated in a nuclear reactor 12 as the heat source of a steam generator 14 thorough the intermediary of the primary cooling water. The primary cooling water circulation line 10 comprises the nuclear reactor 12, the steam generator 14, a primary cooling water pump 16, a regenerative heat exchanger 18 and pipings 20, 21, 22, 24. The nuclear reactor 12 is connected to the steam generator 14 through the piping 20, and the steam generator 14 is connected to the primary cooling water pump 16 through the piping 21, and the primary cooling water pump 16 is connected to the nuclear reactor 12 through the piping 22. The piping 24 branched from a junction 23 of the piping 21 is connected to the regenerative heat exchanger 18.

As the nuclear reactor 12, a nuclear reactor commonly used in a PWR power plant may be used.

The steam generator 14 is a device to generate steam by heat exchange with the secondary cooling water by using the primary cooling water as the heat medium that is made high in temperature and pressure in the nuclear reactor 12.

The regenerative heat exchanger 18 is a device to conduct heat exchange between the primary cooling water having exchanged heat in the steam generator 14 and the primary cooling water supplied from the CVCS 30.

Additionally, the junction 23 and the respective junctions in the below-described respective systems may be designed so as to have a structure that allows the opening and closing or the flow rate control at the gate of each of the junctions, and thus the respective branched lines may be properly used according to the operation conditions of the devices.

(Chemical and Volume Control System: CVCS)

The CVCS 30 is a system to purify the primary cooling water by removal of the fission products and corrosion products in the primary coolant system 8 and to control the amount of the primary cooling water and the concentrations of boron and anti-corrosive agents. The CVCS 30 comprises a non-regenerative heat exchanger 31, a mixed bed demineralization vessel entrance filter 32, a mixed bed demineralization vessel 33, a cation demineralization vessel 35, a boron removal demineralization vessel 37, a cooling water filter 38, a volume control tank 39, a pure water tank 80, a chemical tank 82, pipings 40, 41, 43, 44, 46, 47, 49, 50, 51, 53, 55, 57, 58, 81, 83 and valves 34, 36.

The regenerative heat exchanger 18 and the non-regenerative heat exchanger 31 are connected to each other through the piping 40. The non-regenerative heat exchanger 31 and the mixed bed demineralization vessel entrance filter 32 are connected to each other through the piping 41. The piping 41 is branched at a junction 42 to the piping 51 and the piping 51 is connected to the cooling water filter 38. The mixed bed demineralization vessel entrance filter 32 and the mixed bed demineralization vessel 33 are connected to each other through the piping 43, and the piping 44 connected to the mixed bed demineralization vessel 33 is connected at a junction 52 to the piping 51. The piping 44 is branched at a junction 45 to the piping 46, and the piping 46 is connected by way of the valve 34 to the cation demineralization vessel 35. The piping 47 is connected to the cation demineralization vessel 35, and the piping 47 is also connected to the piping 44. The piping 44 is branched at a junction 48 to the piping 49, and the piping 49 is connected by way of the valve 36 to the boron removal demineralization vessel 37. The piping 50 is connected to the boron removal demineralization vessel 37, and the piping 50 is also connected to the piping 44.

The respective branched lines may be designed to have a configuration that allows these branched lines to be properly used according to the treatment conditions. For example, the treated water from the mixed bed demineralization vessel 33 usually flows from the line 44 (through the junctions 45, 48) into the line 51 through the junction 52. The lines 46, 47 and the cation demineralization vessel 35 between the lines, and the lines 49, 50 and the boron removal demineralization vessel 37 between the lines, are two by-pass lines in relation to the line 44. For example, when the lithium ion (cation) in this system is intended to be decreased, the three-way valve (not shown) on line 44, disposed at the junction 45 is "closed" at the downstream side, and the valve 34 is "opened", and then the treated water from the mixed bed demineralization vessel 33 flows into the line 46, 47 and the cation demineralization vessel 35 between the lines. When the borate ion (anion) in this system is intend to be decreased, the three-way valve (not shown) on the line 44, disposed at the junction 48 is "closed" at the downstream side, and the valve 36 is "opened", and then the treated water from the mixed bed demineralization vessel 33 flows into the line 49, 50 and the boron removal demineralization vessel 37 between the lines. Further, depending on the purpose of the treatment, these two by-pass lines may also be used simultaneously.

The cooling water filter 38 and the volume control tank 39 are connected to each other through the piping 53. The piping 53 is branched at a junction 54 to a piping 70. To the piping 53, the piping 55 branched at a junction 56 of the piping 58 is connected. The volume control tank 39 is connected to the regenerative heat exchanger 18 through the piping 57. To the piping 58, the piping 81 of the pure water tank 80 is connected. To the piping 57, the piping 83 of the chemical tank 82 is connected.

The non-regenerative cooler 31 is a device to further reduce the temperature of the primary cooling water from the generative heat exchanger 18.

The mixed bed demineralization vessel entrance filter 32 is a device to remove the components, such as fine particles, which cannot be removed by the ion exchange resin. Examples of the filter 32 may include a pleated filter made of a polypropylene nonwoven fabric.

The mixed bed demineralization vessel 33 is a device to remove the impurities such as chloride ion and fluoride ion, the fission products such as $^{131}I$ and the corrosion products of $^{58}Co$, $^{60}Co$, nickel, iron and the like in the primary cooling water. The mixed bed demineralization vessel r 33 is loaded with a mixed ion exchange resin composed of an anion exchange resin and a cation exchange resin.

The anion exchange resin loaded in the mixed bed demineralization vessel 33 is a boric acid-resistant anion exchange resin.

The cation exchange resin loaded in the mixed bed demineralization vessel 33 has an ion form of $^{7}Li$. The structure of the lithium-form cation exchange resin is not particularly limited; the lithium-form cation exchange resin may be either a gel type or a porous type. The lithium-form cation exchange resin may be either a strongly acidic cation exchange resin or a weakly acidic cation exchange resin; however, a strongly acidic cation exchange resin is more preferable.

The mixing ratio between the anion exchange resin and the cation exchange resin in the mixed bed demineralization vessel 33 is not particularly limited; however, the mixing ratio between the anion exchange resin and the cation exchange resin is preferably 1:1 in terms of the ion exchange capacity ratio.

The cation demineralization vessel 35 is a device to mainly control the lithium concentration in the primary cooling water and to mainly reduce the concentration of cesium hardly removable in the mixed bed demineralization vessel 33. The cation demineralization vessel 35 is loaded with a cation exchange resin. This cation exchange resin is an H-form cation exchange resin.

The boron removal demineralization vessel 37 is a device to mainly remove the boric acid in the primary cooling water to control its concentration. For the boron removal demineralization vessel 37, a porous anion exchange resin, an OH-form anion exchange resin and the like can be used. When a porous anion exchange resin is used, the same anion exchange resin as loaded in the mixed bed demineralization vessel 33 can be used. When an OH-form anion exchange resin is used, the structure of the OH-form anion exchange resin is not particularly limited as long as the used resin is OH-form; the OH-form anion exchange resin may be either a gel type or a porous type. Additionally, the matrix of the anion exchange resin loaded in the boron removal demineralization vessel 37 may be a styrene matrix or an acrylic matrix.

The cooling water filter 38 is a device to remove suspended substances such as metal corrosion products not removable with ion exchange resins and to remove fine particles leaked from the mixed bed demineralization vessel 33, the cation demineralization vessel 35 and the boron removal demineralization vessel 37. The cooling water filter 38 is the same as the mixed bed demineralization vessel entrance filter 32.

The volume control tank 39 is not particularly limited, and the one used in a common PWR power plant may be used.

The pure water tank 80 stores the pure water used for the primary cooling water. The chemical tank 82 is used to add lithium to adjust the pH of the primary cooling water, hydrazine to remove oxygen at the start of the operation, or hydrogen peroxide during the halt of the operation.

(Boric Acid Recovery System: BRS)

The BRS 60 recovers the boric acid in the primary cooling water for recycling. The BRS 60 comprises a cooling water storage tank 61, a mixed bed demineralization vessel 62, a cooling water filter 63, a boric acid recovery device 64, a cooler 65, a mixed bed demineralization vessel 66, a boric acid tank 67, a boric acid filter 68 and pipings 70, 71, 72, 73, 74, 76, 77. The treated water from the mixed bed demineralization vessel 66 is discharged to the outside of the system.

The piping 70 branched at a junction 54 of the piping 53 of the CVCS 30 is connected to the cooling water storage tank 61. The cooling water storage tank 61 and the mixed bed demineralization vessel 62 are connected to each other through the piping 71, the mixed bed demineralization vessel 62 and the cooling water filter 63 are connected to each other through the piping 72, and the cooling water filter 63 and the boric acid recovery device 64 are connected to each other through the piping 73. To the boric acid recovery device 64, the piping 74 and the piping 76 are connected. The piping 74 is connected by way of the cooler 65 to the mixed bed demineralization vessel 66. The piping 76 is connected to the boric acid tank 67, and the boric acid tank 67 and the boric acid filter 68 are connected to each other through the piping 77. The boric acid filter 68 is connected through the piping 58 to the piping 57.

The mixed bed demineralization vessel 62 is the same as the mixed bed demineralization vessel 33.

The cooling water filter 63 is a device to remove the components, such as fine particles that cannot be removed by the ion exchange resin, and the filter 63 is the same as the mixed bed demineralization vessel entrance filter 32.

The boric acid recovery device 64 is a device to concentrate the boric acid in the primary cooling water and to separate the primary cooling water into a boric acid concentrated solution and water.

The cooler 65 is a device to condensate the water separated in the boric acid recovery device 64.

The mixed bed demineralization vessel 66 is a device to purify the water separated in the boric acid recovery device 64. The structure of the anion exchange resin loaded in the mixed bed demineralization vessel 66 is not particularly limited; the anion exchange resin may be either a gel type or a porous type. The type of the anion exchange resin may be either a strongly basic anion exchange resin or a weakly basic anion exchange resin. The cation exchange resin loaded in the mixed bed demineralization vessel 66 is not particularly limited, and the same cation exchange resin as used in the mixed bed demineralization vessel 33 can be used.

The boric acid filter 68 is a device to remove the fine particles and the like contained in the concentrated boric acid aqueous solution.

(Spent Fuel Pit Water Cooling System: SFPCS)

The SFPCS 100 is a system to conduct the decay heat removal of the spent fuel stored in the pit and to purify the pit water. The SFPCS 100 comprises a fuel pit 104, a mixed bed demineralization vessel 110, a spent fuel pit filter 111, a cooler 112 and pipings 120, 122, 123, 124, 125.

The fuel pit 104 comprises a nuclear reactor well 101, a partition wall 103 and a spent fuel pit 102. In the nuclear reactor well 101 and the spent fuel pit 102, the primary cooling water is stored.

The nuclear reactor well 101 is disposed on the top of the nuclear reactor 12, the spent fuel pit 102 is disposed so as to abut on the nuclear reactor well 101 through the intermediary of the partition wall 103. The spent fuel pit 102 and the cooler 112 are connected to each other through the piping 120. The cooler 112 is connected to the piping 124 through the piping 125. The piping 120 is branched at a junction 121 to the piping 122, the piping 122 is connected to the mixed bed demineralization vessel 110. The mixed bed demineralization vessel 110 and the spent fuel pit filter 111 are connected to each other through the piping 123. To the spent fuel pit filter 111, the piping 114 is connected, and the piping 124 is connected to the spent fuel pit 102.

The fuel pit 104 is not particularly limited, and a fuel pit commonly used in a PWR power plant may be used.

The mixed bed demineralization vessel 110 is similar to the mixed bed demineralization vessel 33.

The spent fuel pit filter 111 is a device to remove the components, such as fine particles, which cannot be removed by the ion exchange resin, and is the same as the mixed bed demineralization vessel entrance filter 32.

The cooler 112 is a device to remove the decay heat generated by the spent fuel.

(Method for Purifying Primary Cooling Water)

Hereinafter, a method for purifying the primary cooling water is described.

As used herein, "purifying" means the removal of impurities such as chloride ion and fluoride ion, fission products such as $^{131}I$, and corrosion products of $^{58}Co$, $^{60}Co$, nickel, iron and the like from the primary cooling water.

The primary cooling water is circulated in the primary cooling water circulation line 10 by the primary cooling water pump 16. The primary cooling water cools the nuclear reactor 12 and becomes high both in temperature and pressure (for example the temperature is 322° C. and the pressure is 15.4 MPa). The primary cooling water made high in temperature and pressure is transferred by way of the piping 20 to the steam generator 14. The primary cooling water transferred to the steam generator 14 exchanges heat with the secondary cooling water, through the heat exchanger in the steam generator 14, to generate the steam for use in power generation. The primary cooling water having exchanged heat in the steam generator 14 is transferred by way of the piping 21 to the primary cooling water pump 16, and is led from the primary cooling water pump 16 by way of the piping 22 to the nuclear reactor 12. On the other hand, a fraction of the primary cooling water having exchanged heat in the steam generator 14 is transferred from the junction 23 of the piping 21 by way of the piping 24 to the regenerative heat exchanger 18. The primary cooling water transferred by way of the piping 24 to the regenerative heat exchanger 18 exchanges heat with the primary cooling water transferred from the CVCS 30, and is then transferred to the non-regenerative heat exchanger 31.

Next, under the conditions that the valves 34, 36 are closed, the primary cooling water cooled in the non-regenerative heat exchanger 31 is transferred, by way of the piping 41, the mixed bed demineralization vessel entrance filter 32 and the piping 43, to the mixed bed demineralization vessel 33. The primary cooling water is brought into contact with the boric acid-resistant anion exchange resin in the mixed bed demineralization vessel 33, where anions such as chloride ion, fluoride ion and sulfate ion are removed. At the same time, the primary cooling water is also brought into contact with the cation exchange resin in the vessel 33 that removes cations such as nickel ion, iron ion and cobalt ion. Thereafter, the primary cooling water is led, through the piping 44 and at the junction 52, to the piping 51.

When the lithium concentration and the cesium concentration in the primary cooling water are adjusted, the primary cooling water from the mixed bed demineralization vessel 33 goes threw through the cation demineralization vessel 35 under the conditions that the valve 34 is opened and the valve 36 is closed. Further, when the boron concentration in the primary cooling water is decreased in a case such as the resumption of the operation after the halt of the operation of a PWR power plant, the primary cooling water goes threw through the boron removal demineralization vessel 37 under the condition that the valve 36 is opened. Thus, the purifying of the primary cooling water is accomplished.

The purified primary cooling water goes threw, by way of the piping 44, the junction 52, the piping 51, the cooling water filter 38 and the piping 53 in this order, and stored in the volume control tank 39. The primary cooling water stored in the volume control tank 39 is supplied with one or more chemicals from the chemical tank 82 to adjust the chemical concentration(s) to be optimal, supplied with the pure water from the pure water tank 80 and/or supplied with the boric acid recovered in the BRS 60, and is led, by way of the piping 57 and the regenerative heat exchanger 18 to the primary cooling water circulation line 10 (hereinabove described is the CVCS 30).

Additionally, a fraction of the primary cooling water from which the fission products, the corrosion products and the like have been removed goes threw, from the junction 54 of the piping 53 by way of the piping 70, and stored in the cooling water storage tank 61. The primary cooling water in the cooling water storage tank 61 goes threw, by way of the piping 71, through the mixed bed demineralization vessel 62. Meanwhile, the fission products, the corrosion products and the like in the primary cooling water are further removed. Thereafter, the primary cooling water is transferred, by way of the piping 72, the cooling water filter 63 and the piping 73, to the boric acid recovery device 64. The concentrated boric acid aqueous solution obtained by the boric acid recovery device 64 goes threw, through the piping 76, and stored in the boric acid tank 67. Thereafter, the primary cooling water passed through the piping 77, the boric acid filter 68 and the piping 58, is appropriately diluted with the pure water of the pure water tank 80, and is then led to the piping 57. Additionally, a fraction of the concentrated boric acid aqueous solution diluted with pure water is transferred, from the junction 56 of the piping 58 by way of the piping 55, to the volume control tank 39 in the primary coolant system 8. On the other hand, the water separated in the boric acid recovery device 64 goes threw, by way of the piping 74 and the cooler 65, through the mixed bed demineralization vessel 66 to be further purified (hereinabove described is the BRS 60).

The fuel having been spent in the nuclear reactor 12 is taken out from the nuclear reactor 12 to the nuclear reactor well 101, then transferred to the spent fuel pit 102 while the partition wall 103 of the fuel pit 104 is transiently opened. The spent fuel is immersed in the primary cooling water in the spent fuel pit 102. The primary cooling water in the spent fuel pit 102 is transferred through the piping 120 to the cooler 112 to be cooled, and then transferred by way of the pipings 125, 124 to the spent fuel pit 102. A fraction of the primary cooling water is transferred, by way of the piping 120, the junction 121 and the piping 122, to the mixed bed demineralization vessel 110 to be purified. Then the purified primary cooling water is transferred, by way of the piping 123, the spent fuel pit filter 111 and the piping 124, to the spent fuel pit 102. In this way, the purified and cooled primary cooling water is supplied to the spent fuel pit 102 (hereinabove described is the SFPCS 100).

In the demineralizers of the primary coolant system 8, the boron concentration of the primary cooling water brought into contact with the boric acid-resistant anion exchange resin is not particularly limited, and falls, for example, within a range from 500 to 10000 ppm in the actual operation. The present invention is more effective when operated with the boron concentration of 3000 ppm or more, and is particularly effective when operated with the boron concentration of 3500 ppm or more.

As described above, the use of the boric acid-resistant anion exchange resin in the demineralizers of the primary coolant system 8 prevents the damage such as breaking or cracking of the anion exchange resin even when the anion exchange resin is brought into contact with the high concentration boric acid aqueous solution. Accordingly, the leakage of the anion exchange resin-originating particles from the demineralizers can be extremely low, and hence the filter or the like disposed in the subsequent stage of each of the demineralizers can be prevented from being blocked at an early stage of the operation.

In the above-described primary coolant system 8, the boric acid-resistant anion exchange resin is loaded in all of the demineralizers in the mixed bed demineralization vessel 33, the boron removal demineralization vessel 37, the mixed bed demineralization vessel 62 and the mixed bed demineralization vessel 110. However, the present invention is not limited to this case, and the boric acid-resistant anion exchange resin may be loaded in at least one of these demineralizers.

When an OH-form anion exchange resin-containing demineralizer is disposed in the primary coolant system, the OH-form anion exchange resin is subjected to the above-described borate ion replacement treatment to convert it into the boric acid-resistant, and then the primary coolant system 8 is operated. Also in this method, the use of the borate-form anion exchange resin in the demineralizers of the primary coolant system 8 prevents the damage such as breaking or cracking of the anion exchange resin even when the anion exchange resin is brought into contact with the high concentration boric acid aqueous solution. Accordingly, the leakage of the anion exchange resin-originating particles from the demineralizers can be extremely low, and hence the filter or the like disposed in the subsequent stage of each of the demineralizers can be prevented from being blocked at the early stage of operation.

In the case where a demineralizer having the OH-form anion exchange resin is incorporated into the primary coolant system, the borate ion replacement treatment could be applied to this resin, provided that the primary coolant system has a system capable of transferring the boric acid aqueous solution having an intended boron concentration to the demineralizer. Additionally, where necessary, an additional provision of a system for the borate ion replacement treatment such as a system to introduce water for use in dilution may also be possible.

EXAMPLES

Hereinafter, the present invention is specifically illustrated with, but not to limited to, the Examples below.

The pore volumes and the average pore radii in the following Examples and Comparative Examples were measured by the mercury intrusion porosimetry method using a mercury porosimeter (Autopore IV 9520, manufactured by Shimadzu Corp.).

Example 1

The breakage rate of porous anion exchange resin Amberjet (trade name) 9090 (pore volume: 0.16 mL/g-dry resin (measured with Cl form), average pore radius: 17 nm (measured with Cl form), manufactured by Rohm and Haas Co.), was measured (the breakage rate before solution passing). Next, 15 mL of Amberjet (trade name) 9090 was filled in a glass column of 21 mm in inner diameter to prepare an anion exchange column A. Through the anion exchange column A thus obtained, a boric acid aqueous solution of 4700 ppm in terms of boron went threw at an SV (space velocity) =20 L/L-R·h$^{-1}$ for 1 hour. After passing the solution, the porous anion exchange resin A was taken out and the breakage rate of the resin was measured (the breakage rate after solution passing). The measured results are shown in Table 1.

(Breakage Rate Measurement)

Randomly 300 beads of the resin were taken out and subjected to a microscopic observation (with a magnification of 25) to count the number of the resin beads showing breakage such as breaking and/or cracking. The breakage rate is represented by the percentage derived from the following formula (2).

$$\text{Breakage rate}(\%) = (\text{the number of broken resin beads}) \div 300 \times 100\% \quad (2)$$

Comparative Example 1

The breakage rate of the resin before and after solution passing were measured in the same manner as in Example 1 except that the anion exchange resin was Amberlite (trade name) PCA1 (manufactured by Rohm and Haas Co.), OH-form gel-type anion exchange resin. The measured results are shown in Table 1.

Comparative Example 2

The breakage rates before and after solution passing were measured in the same manner as in Example 1 except that the anion exchange resin was Diaion (trade name) SAN1 (manufactured by Mitsubishi Chemical Corp.), an OH-form gel-type anion exchange resin. The measured results are shown in Table 1.

TABLE 1

|  | Ex. 1 | Com. Ex. 1 | Com. Ex. 2 |
| --- | --- | --- | --- |
| Anion exchange resin | Amberjet 9090 | Amberlite PCA1 | Daiaion SAN1 |
| Resin structure | Porous type | Gel type | Gel type |
| Ion form | OH-form | OH-form | OH-form |
| Pore volume (mL/g-dry resin) (measured with Cl form) | 0.16 | — | — |
| Average pore radius (nm) (measured with | 17 | — | — |

TABLE 1-continued

|  | Ex. 1 | | Com. Ex. 1 | | Com. Ex. 2 | |
| --- | --- | --- | --- | --- | --- | --- |
| Cl form) Breakage rate (%) | (Before solution passing) | (After solution passing) | (Before solution passing) | (After solution passing) | (Before solution passing) | (After solution passing) |
|  | <1 | <1 | <1 | 23 | <1 | 21 |

As shown in Table 1, in Example 1 in which a porous anion exchange resin was used, the breakage rates before and after solution passing were less than 1%. On the contrary, in each of Comparative Examples 1 and 2 in which an OH-form gel-type anion exchange resin was used, the breakage rate before solution passing was less than 1% but that of after solution passing was greater than 20%. From this fact, it was found that the porous anion exchange resin hardly undergoes the breakage due to the contact with boric acid.

Preparation Example 1

Preparation of the Borate-Form Anion Exchange Resin A 5 mL of Amberlite (trade name) PCA1 (manufactured by Rohm and Haas Co.), an OH-form gel-type anion exchange resin, was filled in a glass column of 21 mm diameter, and a boric acid aqueous solution of a boron concentration of 3000 ppm went threw at an SV=20 L/L-R·h$^{-1}$ for 1 hour to prepare a borate-form anion exchange resin A.

Preparation Example 2

Preparation of the Borate-Form Anion Exchange Resin B 15 mL of Amberjet (trade name) 9090 (manufactured by Rohm and Haas Co.), an OH-form porous anion exchange resin, was filled in a glass column 21 mm in inner diameter, and a boric acid aqueous solution of a boron concentration of 3000 ppm went threw at an SV=20 L/L-R·h$^{-1}$ for 1 hour to prepare a borate-form anion exchange resin B.

Example 2

The breakage rate of the borate-form anion exchange resin A obtained in the preparation example 1 was measured (the breakage rate before solution passing). Next, 15 mL of the borate-form anion exchange resin A was filled in a glass column of 21 mm in inner diameter to prepare an anion exchange column A. Through the anion exchange column A thus obtained, a boric acid aqueous solution having a boron concentration of 4700 ppm went threw at an SV=20 L/L-R·h$^{-1}$ for 1 hour. After passing the solution, the borate-form anion exchange resin A was taken out and the breakage rate of the resin was measured (the breakage rate after solution passing). The obtained results are shown in Table 2.

Example 3

The breakage rates before and after solution passing were measured in the same manner as in Example 1 except that the borate-form anion exchange resin A was replaced with the borate-form anion exchange resin B obtained in the preparation example 2. The obtained results are shown in Table 2.

Comparative Example 3

The breakage rate before and after solution passing were measured in the same manner as in Example 1 except that the borate-form anion exchange resin A was replaced with Amberlite (trade name) PCA1 free from the borate ion replacement. The obtained results are shown in Table 2.

TABLE 2

|  | Ex. 2 | | EX. 3 | | Com. Ex. 3 | |
| --- | --- | --- | --- | --- | --- | --- |
| Resin structure | Gel type | | Porous type | | Gel type | |
| Ion form | Borate ion-form | | Borate ion-form | | OH-form | |
| Boron concentration (ppm) | 4700 | | 4700 | | 4700 | |
| Breakage rate (%) | (Before solution passing) | (After solution passing) | (Before solution passing) | (After solution passing) | (Before solution passing) | (After solution passing) |
|  | <1 | 5 | <1 | <1 | <1 | 20 |

As shown in Table 2, in Example 2 in which the borate-form anion exchange resin A was used, the breakage rate of the resin before passing a boric acid aqueous solution having a boron concentration of 4700 ppm was less than 1% and the breakage rate of the resin after passing the same solution was 5%. Additionally, in Example 3 in which the borate-form anion exchange resin B was used, the breakage rates of the resin before and after passing a boric acid aqueous solution having a boron concentration of 4700 ppm were less than 1%. On the contrary, in Comparative Example 3 in which an OH-form gel-type anion exchange resin was used, the breakage rate before passing the boric acid aqueous solution having a boron concentration of 4700 ppm was less than 1% but that of the resin after passing the same solution was found to be 20%. From this fact, it was found that the anion exchange resin beforehand converted into a borate ion form hardly undergoes the breakage due to the contact with boric acid.

Example 4

The breakage rate of Amberlite (trade name) PCA1, an OH-form gel-type anion exchange resin, was measured (the breakage rate before replacement). Next, 15 mL of Amberlite PCA1 was filled in a glass column of 21 mm in inner diameter to prepare an anion exchange column D. Through the anion exchange column D thus obtained, a boric acid aqueous solution having a boron concentration of 1000 ppm went threw at an SV=20 L/L-R·h$^{-1}$ for 1 hour. Thereafter, through the anion exchange column D, a boric acid aqueous solution having a boron concentration of 3300 ppm went threw at an SV=20 L/L-R·h$^{-1}$ for 1 hour (stepwise method) to conduct borate ion replacement. The anion exchange resin having been converted into a borate ion-form was taken out and the breakage rate of the resin was measured in the same manner as in Example 1 (the breakage rate after replacement). The obtained results are shown in Table 3.

Comparative Example 4

The breakage rate of Amberlite (trade name) PCA1 was measured (the breakage rate before replacement). Next, 15 mL of Amberlite (trade name) PCA1 was filled in a glass column of 21 mm in inner diameter to prepare an anion exchange column E. Through the anion exchange column E thus obtained, a boric acid aqueous solution having a boron concentration of 3300 ppm went threw at an SV=20 L/L-R·h$^{-1}$ for 1 hour (one step method) to conduct borate ion replacement. The anion exchange resin having been converted into a borate ion-form was taken out and the breakage rate of the resin was measured in the same manner as in Example 1 (the breakage rate after replacement). The obtained results are shown in Table 3.

TABLE 3

|  | Ex. 4 | Com. Ex. 4 |
|---|---|---|
| Resin structure | Gel type | Gel type |
| Ion form | OH-form | OH-form |
| Borate ion replacement method | Stepwise method | One step (Batch) method |

|  | (Before replacement) | (After replacement) | (Before replacement) | (After replacement) |
|---|---|---|---|---|
| Breakage rate (%) | <1 | 5 | <1 | 10 |

As shown in Table 3, in Example 4 in which the borate ion replacement was conducted by stepwise increase of the boron concentration, the breakage rate of the resin before the replacement was less than 1%, and that of after the replacement was 5%. On the contrary, in Comparative Example 4 in which the borate ion replacement was conducted by bringing the boric acid aqueous solution having a boron concentration of 3300 ppm into contact with the resin, that of before the replacement was less than 1% and that of after the replacement was 10%. From this fact, it was found that the breakage of the resin can be reduced by conducting the borate ion replacement of the OH-form gel-type anion exchange resin through a stepwise increase of the boron concentration.

Example 5

The breakage rate of Amberlite (trade name) PCA1 was measured (the breakage rate before replacement). Next, 15 mL of Amberlite (trade name) PCA1 was filled in a glass column of 21 mm in inner diameter to prepare an anion exchange column F. Through the anion exchange column F thus obtained, a boric acid aqueous solution having a boron concentration of 3300 ppm went threw at an SV=12 L/L-R·h$^{-1}$ for 1 hour to conduct borate ion replacement. The anion exchange resin having been converted into a borate ion-form was taken out and the breakage rate of the resin was measured in the same manner as in Example 1 (the breakage rate after replacement). The obtained results are shown in Table 4.

Comparative Example 5

The breakage rates before and after the replacement were measured in the same manner as in Example 5 except that the boric acid aqueous solution having a boron concentration of 3300 ppm went threw at an SV=20 L/L-R·h$^{-1}$ for 1 hour. The obtained results are shown in Table 4.

TABLE 4

|  | Ex. 5 | Com. Ex. 5 |
|---|---|---|
| Resin structure | Gel type | Gel type |
| Ion form | OH-form | OH-form |
| Flow rate SV (L/L-R·h$^{-1}$) | 12 | 20 |

|  | (Before replacement) | (After replacement) | (Before replacement) | (After replacement) |
|---|---|---|---|---|
| Breakage rate (%) | <1 | 5 | <1 | 10 |

As shown in Table 4, in Example 5 in which the borate ion replacement was conducted at an SV=12 L/L-R·h$^{-1}$, the breakage rate of the resin before the replacement was less than 1%, and that of after the replacement was 5%. On the contrary, in Comparative Example 5 in which the borate ion replacement was conducted by bringing the boric acid aqueous solution into contact with the resin at an SV=20 L/L-R·h$^{-1}$, the breakage rate of the resin before the replacement was less than 1% and the breakage rate of the resin after the replacement was 10%. From this fact, it was found that the breakage of the resin can be reduced by conducting the borate ion replacement of the OH-form gel-type anion exchange resin at a low SV.

What is claimed is:

1. A primary coolant system of a pressurized-water reactor power plant, comprising a demineralizer, which purifies primary cooling water of said pressurized-water reactor power plant, and at least one system of a chemical and volume control system, a boric acid recovery system and a spent fuel pit water puritying-coolant system,
   wherein the demineralizer is installed in a demineralization purifying treatment section in the at least one system of the chemical and volume control system, the boric acid recovery system and the spent fuel pit water coolant system,
   said demineralizer comprising an anion exchange resin-containing layer,
   wherein the anion exchange resin is:
   a porous anion exchange resin having a pore volume of 0.05 to 0.50 mL/g-dry resin (measured with CI form) and an average pore radius of 2 to 50 nm (measured with CI form), and
   said primary cooling water brought into contact with said anion exchange resin-containing layer having a boron concentration within a range from 3000 to 10000 ppm.

2. The primary coolant system according to claim 1,
   wherein the anion exchange resin is a porous borate-form, having been changed from OH-form to borate form before contacting water to be treated.

3. A method for purifying a primary cooling water in a primary coolant system of a pressurized-water reactor power plant according to claim 1 comprising:
   setting said demineralizer in the demineralization purifying treatment section in the primary coolant system; and
   conducting purification by bringing the primary cooling water to be demineralized into contact with said demineralizer.

4. The primary coolant system of a pressurized-water reactor power plant according to claim 1, further, comprising a filter in the demineralization purifying treatment section, which conducts filtration treatment of the treated water discharged from said demineralizer.

5. A demineralizer installed in a demineralization purifying treatment section in at least one system of a chemical and volume control system, a boric acid recovery system and a spent fuel pit water purifying coolant system in a primary coolant system of a pressurized-water reactor power plant,
   said demineralizer comprising an anion exchange resin containing layer to purify primary cooling water of said pressurized-water reactor power plant, which has a boron concentration between 3000 to 10000 ppm,
   wherein the anion exchange resin is a porous borate-form anion exchange resin having a pore volume of 0.05 to 0.50 mL/g-dry resin (measured with CI form) and an average pore radius of 2 to 50 nm (measured with CI form).

6. The demineralizer according to claim 5, wherein the borate-form anion exchange resin is obtained by replacing an OH-form anion exchange resin with borate ion by passing a boric acid aqueous solution through a resin layer comprising the OH-form anion exchange resin in a container,
   wherein the boron concentration is increased along with the integrated flow volume of the boric acid aqueous solution while the solution goes through.

7. The demineralizer according to claim 6, wherein the boron concentration of the boric acid aqueous solution initially brought into contact with the resin layer is 3000 ppm or less.

8. The demineralizer according to claim 5, wherein the borate-form anion exchange resin is obtained by replacing an OH-form anion exchange resin with borate ion by passing a boric acid aqueous solution through a resin layer comprising the OH-form anion exchange resin in a container, wherein the boric acid aqueous solution goes threw through the resin layer at a space velocity SV of 15 $L/L\text{-}R\cdot h^{-1}$ or less.

* * * * *